Figure 1:
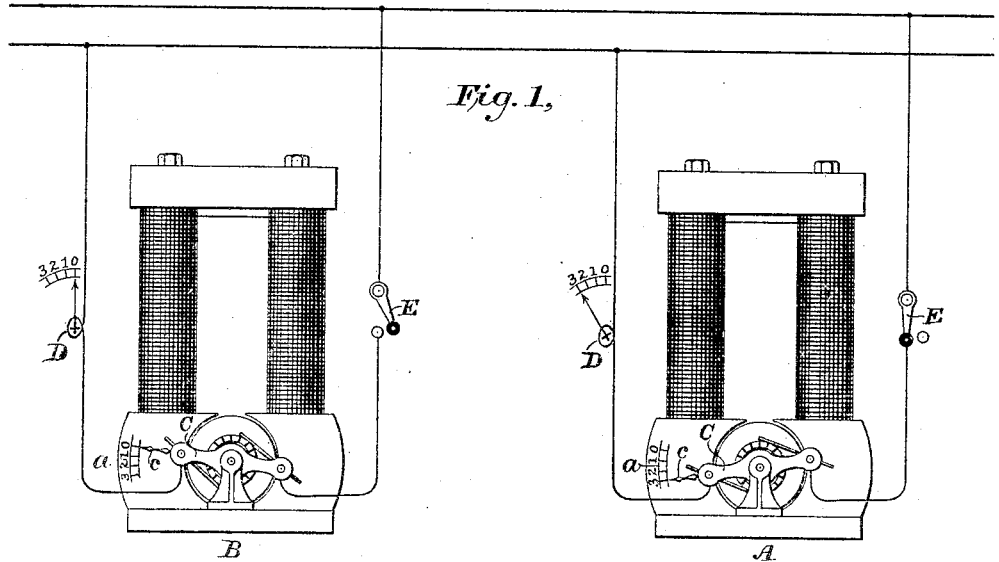

(No Model.)
2 Sheets—Sheet 1.

S. S. WHEELER.
SYSTEM OF ELECTRICAL DISTRIBUTION.

No. 335,099.  Patented Jan. 26, 1886.

WITNESSES
Wm A. Skinkle.
Geo. W. Breck.

INVENTOR
Schuyler S. Wheeler,
By his Attorneys
Curtis & Crocker

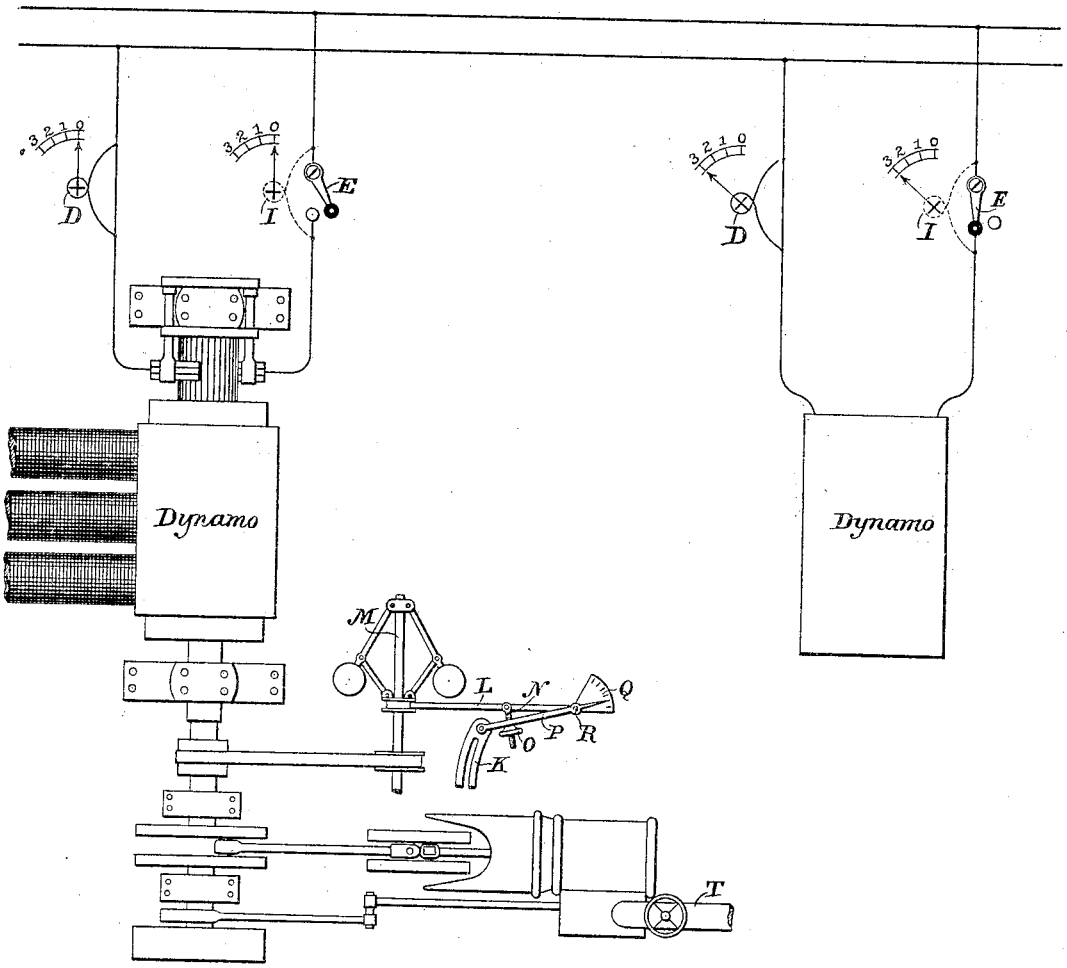

UNITED STATES PATENT OFFICE.

SCHUYLER S. WHEELER, OF NEW YORK, N. Y.

SYSTEM OF ELECTRICAL DISTRIBUTION.

SPECIFICATION forming part of Letters Patent No. 335,099, dated January 26, 1886.

Application filed September 24, 1883. Serial No. 107,245. (No model.)

*To all whom it may concern:*

Be it known that I, SCHUYLER S. WHEELER, of the city, county, and State of New York, have invented a new and useful Improvement in Systems of Electrical Distribution, of which the following is a specification.

My invention concerns a system of electrical distribution for the supply of light, power, heat, or other sensible effect by electricity, which is fed by dynamo-electric machines or other sources of electrical energy in multiple arc, and which sometimes requires two or more of such machines or sources, and sometimes a greater or less number to supply the variable wants of the consumers.

It relates to the operation of connecting and disconnecting dynamo-machines in multiple arc to and from the system in order to increase and diminish the supply of electrical energy according to the demand. In the practical working of such a system, when the dynamo-machines are large and of low internal resistance, and especially when each machine is driven by an independent steam-engine, it has been found very difficult to connect or disconnect machines to or from the system in multiple arc with the others without suddenly throwing a heavy load upon some of the machines and causing a sudden increase or decrease in the electrical pressure throughout the system, and consequently in the brilliancy of the electric lamps supplied thereby.

Consider the case of connecting on a dynamo-machine, for example: When the machine is started on an open circuit, and its electro-motive force regulated before it is connected to the system in multiple arc with the other machines, the effects produced upon the machines and upon the system by so connecting it depend upon the electro-motive of the new machine at the instant of making the connection. If its electro-motive force is too low, the outgoing or direct electrical pressure from the machine is not sufficient to neutralize the opposing or back electrical pressure from the system, and the effect is, therefore, to allow the main current from the system to flow back through the new machine, which suddenly increases the load upon the other machines, since they have to supply this extra back current, and also produces a momentary drop in the electrical pressure throughout the system on account of the reduction in the speed of the other machines which this extra load occasions. If the electro-motive force of the new machine is too high, the effect is suddenly to throw a very heavy load upon the new machine and to reduce the load upon the other machines, since the new machine, on account of its higher electro-motive force, will then be doing more than its share of the work. This will also cause a sudden rise of electrical pressure throughout the system. If, on the other hand, the electro-motive force of the new machine is exactly equal to that of each of the other machines, the effect is suddenly to throw a heavy load, equal to its share of the work, upon the new machine, and to reduce correspondingly the load upon each of the other machines. This causes a sudden rise in the electrical pressure in the system until the steam-governors have had time to act and equalize the speed of the several machines. The same effects are produced when a machine is taken off or disconnected.

In order, therefore, to connect and disconnect machines without suddenly throwing heavy loads upon the machines, and without disturbing the electrical pressure in the system, the following method has heretofore been employed: The new machine is got working on an independent closed circuit with an artificial load equal to the load it would have to bear if connected so as to feed into the system itself. The best means of accomplishing this has been found to be to connect the new machine to a battery of electric lamps equal in number to that portion of all the lamps of the system it will be required to supply when connected, (which is generally about the maximum number of lamps of one machine,) and its electro-motive force is then regulated to be equal to that of the other machines, so that the new machine is got working under about the same conditions of load as if it were supplying current to the system in multiple arc with the other machines. This independent system of lamps fed by the new machine is then joined to the main system in multiple arc, and if the auxiliary battery of lamps has been properly adjusted and the electro-motive force of the machine carefully regulated no very great shock or disturbance results from so doing, since when the two systems of lamps are combined no more or less power or current is required from either machine to feed them than when they are separated. This extra battery of lamps is then gradually taken off from the system by disconnecting it in sections, leaving the new machine connected on and doing its share of the work necessary to supply whatever may then be the wants of the consumers. In taking off or disconnecting a machine the reverse operation is gone through with; but even with this mode of putting on and taking off machines, it is very difficult to avoid producing some disturbance in the electrical pressure, besides which the method is very objectionable for other reasons. It requires a large battery of lamps or other expensive resistances equal to the full capacity of the machine to be connected. It calls for extra steam-power sufficient to feed this battery of lamps, besides that furnished to the other machines. It involves the troublesome operation of adjusting the number of lamps of the battery in circuit to agree with the load on the system, and it requires considerable time and care to make the necessary connections, changes, &c.

By my invention I am enabled to connect and disconnect machines to and from others in multiple arc without employing any auxiliary battery of lamps or other resistances, without producing the slightest electrical disturbance in the system, and without suddenly increasing or decreasing the load upon any of the machines.

To this end my invention consists in the method and apparatus for carrying out the method hereinafter described and specifically claimed.

In the accompanying drawings, I have illustrated several different ways of carrying out my invention.

In Figure 1, A and B respectively represent two independent dynamo-electric machines feeding into the same circuit in multiple arc, as shown, for supplying the same system. The commutator-brushes of each machine are made adjustable by being mounted upon a rocking holder, C, by which they may be turned concentrically with the commutator and set in any desired position with respect to the field, and the electro-motive force of the machine thereby altered in the well-known manner. To the holder C, I fix a pointer, $c$, which moves over the stationary graduated arc $a$, and thus indicates the relative position of the commutator-brushes, and hence the electro-motive force of the machine. In connection with each machine I sometimes employ a galvanometer, D, arranged to indicate whether any current is flowing through its circuit, and also a circuit-breaking switch, E, to connect and disconnect the machine from the system. Suppose the two machines to be both feeding into the system, and it is desired to take off or disconnect the machine B, for example, the machine A having sufficient capacity to supply the lamps then in operation. By turning the commutator-brush holder C, I gradually reduce the electro-motive force of the machine B until the outgoing electro-motive force or electrical pressure from this machine is exactly equal to the incoming or opposing electrical pressure from the system, or, in other words, until no current is flowing in either direction through the circuit of the machine B, which state of affairs is at once shown by the galvanometer D pointing to $o$. Under these conditions the machine B will be doing no work and generating no current, nor will it be absorbing current from the other machines, and therefore the effect is the same as if this machine were running on an open circuit. I then break the circuit, and thus disconnect the machine by means of the switch E, and no disturbance or effect is produced on either the system or any of the machines, because the new machine is then neither supplying nor taking any electrical energy to or from the system. By this method the machines may be readily disconnected. In order to connect on machines I graduate the arc $a$ so that the pointer $c$ stands at $o$ when the commutator-brushes are in the position which makes the electro-motive force of the machines equal to the incoming electrical pressure from the system, so that by setting the brushes at $o_0$ I am enabled to start the machine on an open circuit and bring its electro-motive force exactly to the point at which it may be jointed with the other machines without disturbance. I then connect the machine to the system by the switch E, and by gradually shifting the commutator-brushes I again raise the electro-motive force until it equals that of the other machine, thereby gradually throwing the load upon the new machine until it is made to perform its share of the work.

Figure 2:
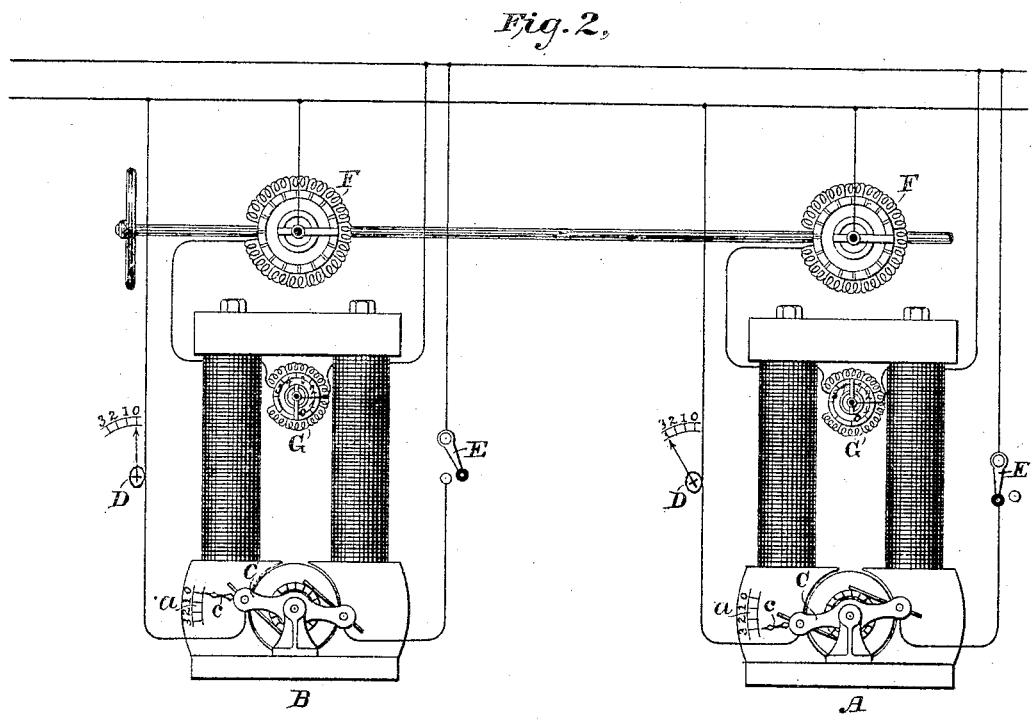

Fig. 2 represents another form of contrivance for carrying out my invention. A and B are separate dynamo-machines, and D D and E E, respectively, their galvanometers and circuit-breaking switches, as in Fig. 1. Each machine is provided with the usual regulating apparatus, consisting of a resistance-switch, F, for regulating the electro-motive force of the machine in the well-known manner, by throwing in or out of the field-circuit more or less resistance, and thus altering the magnetic intensity of the field. I provide each machine also with another regulating-switch, G, for regulating its electro-motive force independently of the usual regulating apparatus, and by means of this auxiliary regulator G, I adjust the electro-motive force of the machine to be connected or disconnected, as the case may be, so that it will exactly neutralize the incoming or back electrical pressure from the system, and thereupon I connect or disconnect the machine to the system by the switch E, as before, without causing the slightest disturbance either in the system or in the machines. After connecting a machine to the system in this way, I gradually raise its electro-motive force until it assumes its share of the load, as before. To enable the switches G to be set at the proper point in connecting a machine, the switches are graduated in any desired manner, as shown, for example, so that the zero-point corresponds to the position of neutralizing electro-motive force. It is evident, however, that the usual regulating apparatus, F F, may be employed to effect the desired regulation in connecting or disconnecting a machine instead of the auxiliary switches G.

Fig. 3 represents another mode of applying my invention. The two figures, marked "Dynamo," represent two independent steam dynamo-machines feeding into the same circuit. Each machine in this case is run by its own steam-engine. My improvement here consists in so constructing the speed-governing mechanism that the speed at which the engine is held by the governor may be varied in order to change the electro-motive force of the machine. For this purpose I connect the valve-gear link K, which imparts motion to the valves in the usual manner, with the speed-governor M by a bar, L, an adjustable connecting-link, N, and another bar, P, so that the position of the link K with respect to the height of the governor-balls may be altered by turning the screw-nut o, and thereby varying the speed at which the governor causes the valve-gear to cut off at the same point as before. The two bars L and P are both pivoted on the stationary pin R, the bar L terminating in a graduated sector, Q, and the bar P in a pointer, as shown, so that the speed for which the governor is adjusted by the nut O is indicated by the position of said pointer on the scale Q. In order to connect the dynamo to the system, I start the machine and adjust the governor by the nut O, so that the speed of the machine is such as to make its electro-motive force just enough to neutralize the back electrical pressure from the system as before, as shown by the pointer on the scale Q, and then close the circuit by the switch E, as before. I then increase the speed of the machine until its electro-motive force becomes equal to that of the other machines, thus gradually throwing part of the load upon the new machine and taking it off from the others without producing the slightest disturbance in the system. In taking off or disconnecting a machine exactly the reverse operation is gone through with. It is evident that the regulation of the speed-governing apparatus to alter the speed of the machine so as to obtain the proper electro-motive may be effected in various other ways than that shown. Instead of regulating the electro-motive of the machine by adjusting the governor M, as explained, the speed may be regulated by closing and opening the throttle-valve T.

Galvanometers D may be used to indicate when no current is flowing through the circuit of the machine, as in Figs. 1 and 2; but by shunting the circuit-breaking switches E by galvanometers I of high resistance, as shown, the electro-motive force of the machine to be connected may be observed before the circuit is closed by the switch E, the closing and opening of the switch E having no very great effect upon the amount of current flowing through the shunting-galvanometer I. This enables the electro-motive of a machine to be accurately regulated, so as to neutralize the opposing pressure from the system before the machine is connected to the system, and while its circuit is practically open.

As I have described my method thus far, the new machine is brought to a condition in which it may be connected or disconnected from the system without disturbance by regulating its electro-motive force, so as to neutralize the electro-motive force from the other machines, which is kept constant; but my invention may be worked in another way. The electro-motive force of the new machine may be kept constant, while that of the other machines is altered sufficiently to neutralize the electro-motive force of the new machine in its own circuit, and then the new machine may be connected or disconnected without disturbance. In disconnecting a machine in this way, for example, I raise the electro-motive force of the other machines until no current flows through the circuit of the said machine, and I then break its circuit. This of course tends to raise the electrical pressure in the system; but under certain conditions this is not objectionable, for the reason that this increase in the electro-motive force of the machines is more or less neutralized by the increase in their combined internal resistance due to the fact that the internal resistance or conductivity of the machine to be taken off is no longer added to that of the others, so as to reduce their joint resistance, since no current is then flowing through the said machine. When, therefore, the circuit of the machine is broken, no further effect is produced. To connect on a new machine in this way, I regulate its electro-motive force to the neutralizing-point and then connect it to the system. I then reduce the electro motive force of the other machines to the proper point, and thereby throw its share of the load upon the new machine.

It is not necessary to my invention that the dynamo-machines or other generators of electrical energy should all be located at the same central station or point of supply. They may be arranged at as many different places on the system as desired, and connected to any desired points thereof by means of my invention, without interfering with the other machines already feeding the same system and without causing disturbance in the electrical pressure in the said system.

My invention may be employed to couple and uncouple machines in series as well as those in multiple arc.

When it is desired to increase the electro-motive force of the machines in operation by adding another machine in series, and it is important that this increase should be effected gradually, I adjust the electro-motive force of the new machine before connecting it, so that its additional electro-motive force, when connected, is just enough to make up for the additional resistance in circuit due to the internal resistance of the new machine. I then connect it to the others without producing any material effect, and then gradually raise its electro-motive force to the desired point. I disconnect the machine by the reverse operation.

It is evident that my invention is applicable to other sources of electrical energy besides dynamo or magneto electric machines, it being immaterial in what manner the electrical energy is generated, and that the electro-motive force of the machines or sources of current may be regulated in any desired way for the purposes of my invention.

My method of coupling and uncoupling machines may be combined, if desirable, with the method hitherto used, (in which a battery of lamps are employed, as I have already explained,) so as to permit a much smaller battery of lamps to be used than would otherwise be the case, and also to avoid the necessary adjustment of these lamps to agree with the load on the system. With this plan the new machine would first be made to feed this independent battery of lamps and its electro-motive regulated, so that when connection is made to the system practically no current will flow either from the other machines back through the new machine or from the new machine into the system and back through the other machines. The electro-motive force of the new machine would then be raised and the battery of lamps then disconnected from the system. In disconnecting a machine the operation would be reversed.

I do not claim herein the apparatus and constructions described, since I am required by the Patent Office to make such claims in a separate application and to confine this application to the method of operation alone.

What I claim as my invention, and desire to secure by Letters Patent, is—

1. The herein-described method of connecting or disconnecting an electrical generator with or from one or more others supplying the same circuit, which consists in producing such a relation between the electro-motive force of said generator and the electro-motive force of the others that practically no current will flow in either direction through said generator, and then connecting or disconnecting said generator.

2. The herein-described method of connecting an electrical generator with the other generators of a multiple-arc system, which consists in regulating its electro-motive force to such a point that practically no current will flow through it in either direction when connected, then connecting it with the circuit in multiple arc with the others, and then gradually raising its electro-motive force until it becomes equal to that of the others.

3. The herein-described method of disconnecting one electrical generator from the others of a multiple-arc system, which consists in reducing the electro-motive force of said generator before breaking its circuit.

4. The herein-described method of disconnecting one electrical generator from the others of a multiple-arc system, which consists in reducing the electro-motive force of said generator until practically no current flows through it in either direction before breaking its circuit.

5. The herein-described method of connecting an electrical generator with one or more others supplying the same circuit, which consists in producing such a relation between the electro-motive force of said generator and the electro-motive force of the others that when the new generator is connected practically no current will flow through it in either direction, then connecting the new generator with the others, and then equalizing the electro-motive forces of the generators so that the new one will assume its share of the load.

6. The herein-described method of connecting or disconnecting a dynamo-electric machine with or from one or more others supplying the same circuit, which consists in regulating the strength of the field-magnet of said generator until its electro-motive force neutralizes that of the others, and then connecting or disconnecting it.

Signed and witnessed this 22d day of September, 1883.

SCHUYLER S. WHEELER.

Witnesses:
JOSEPH M. WILLIAMS,
CHARLES G. CURTIS.